(12) United States Patent
Lee et al.

(10) Patent No.: US 12,529,390 B2
(45) Date of Patent: Jan. 20, 2026

(54) HYDRAULIC APPARATUS FOR AGRICULTURAL VEHICLE

(71) Applicant: LS MTRON LTD., Anyang-si (KR)

(72) Inventors: Jung Uk Lee, Gwacheon-si (KR); Hyeon Koo Lee, Seoul (KR); Jai Yoon Shin, Anyang-si (KR); Han Joon Cho, Seoul (KR)

(73) Assignee: LS MTRON LTD., Anyang-si (KR)

( * ) Notice: Subject to any disclaimer, the term of this patent is extended or adjusted under 35 U.S.C. 154(b) by 195 days.

(21) Appl. No.: 18/565,350

(22) PCT Filed: May 27, 2022

(86) PCT No.: PCT/KR2022/007564
§ 371 (c)(1),
(2) Date: May 22, 2024

(87) PCT Pub. No.: WO2022/255737
PCT Pub. Date: Dec. 8, 2022

(65) Prior Publication Data
US 2025/0261574 A1   Aug. 21, 2025

(30) Foreign Application Priority Data

May 31, 2021   (KR) .......................... 10-2021-0069839

(51) Int. Cl.
*F15B 21/044*   (2019.01)
*F16H 61/00*   (2006.01)

(52) U.S. Cl.
CPC ....... *F15B 21/044* (2013.01); *F15B 2211/615* (2013.01); *F16H 2061/004* (2013.01)

(58) Field of Classification Search
CPC .......................... F15B 21/044; F16H 2061/004
See application file for complete search history.

(56) References Cited

U.S. PATENT DOCUMENTS

2002/0125062 A1* 9/2002 Lucking ................ F15B 21/044
180/417
2007/0175209 A1* 8/2007 Smith ..................... F15B 21/14
60/414

(Continued)

FOREIGN PATENT DOCUMENTS

JP         09060609 A     3/1997
JP         10094304 A     4/1998

(Continued)

OTHER PUBLICATIONS

International Search Report for related International Application No. PCT/KR2022/007564; report dated Aug. 12, 2022; (2 pages).

(Continued)

*Primary Examiner* — Matthew Wiblin
(74) *Attorney, Agent, or Firm* — K&L Gates LLP

(57) ABSTRACT

There present disclosure relates to a hydraulic apparatus for an agricultural work vehicle, the hydraulic apparatus including: a hydraulic passage, and an oil tank configured to store hydraulic oil supplied to the hydraulic passage; a hydraulic pump configured to supply the hydraulic oil to the hydraulic passage; an oil supply conduit disposed on the hydraulic passage, and configured to connect the oil tank and the hydraulic pump to each other; an oil return conduit disposed on the hydraulic passage, connected to the oil tank at one end thereof, and configured to guide the hydraulic oil to the oil tank; and an air drain conduit formed such that one end thereof is connected to the oil supply conduit and the other end thereof is connected to the oil return conduit, and configured to guide air, contained in hydraulic oil flowing through the oil supply conduit, to the oil return conduit.

8 Claims, 7 Drawing Sheets

(56) References Cited

U.S. PATENT DOCUMENTS

| | | | |
|---|---|---|---|
| 2011/0072962 A1* | 3/2011 | Scholtes | F15B 21/044 92/163 |
| 2015/0226241 A1* | 8/2015 | Tanaka | F15B 21/044 96/215 |
| 2020/0072255 A1* | 3/2020 | Dueckinghaus | A01D 43/08 |
| 2021/0283531 A1* | 9/2021 | Wohlers | B01D 19/0036 |

FOREIGN PATENT DOCUMENTS

| | | | |
|---|---|---|---|
| JP | 2004314712 A | 11/2004 | |
| JP | 2007117037 A | 5/2007 | |
| JP | 2016140302 A | 8/2016 | |

OTHER PUBLICATIONS

Written Opinion for related International Application No. PCT/KR2022/007564; report dated Aug. 12, 2022; (6 pages).
Office Action and English Translation for related Korean Application No. 10-2021-0069839; action dated Oct. 13, 2025; (13 pages).

* cited by examiner ated and the steering unit. The steering unit flow path may include a steering unit flow path passing through a steering unit supply conduit, and the air drain conduit may include a second air drain conduit connected to the oil return conduit of the steering unit flow path.

HYDRAULIC APPARATUS FOR AGRICULTURAL VEHICLE

CROSS-REFERENCE TO RELATED APPLICATION

This application is a National Stage of International Application No. PCT/KR2022/007564 filed on May 27, 2022, which claims priority to and the benefit of Korean Patent Application No. 10-2021-0069839, filed on May 31, 2021, the disclosures of which are incorporated herein by reference in its entirety.

FIELD

The present disclosure relates to a hydraulic apparatus for an agricultural work vehicle, and more particularly to a hydraulic apparatus for an agricultural work vehicle that is equipped with a steering unit and a hydraulic pump for supplying hydraulic pressure to a work machine.

BACKGROUND

Agricultural work vehicles are used to grow crops required for human life by using land. For example, combines, tractors, etc. correspond to agricultural work vehicles. Combines are used to cut and thresh crops such as rice, barley, wheat, soybeans, etc. Tractors perform the work required to grow crops by using traction force.

These agricultural work vehicles include a transmission device to adjust torque, speed, etc. during a work process as needed.

Generally, the power generated from the engine of an agricultural work vehicle is mainly transmitted to a steering unit and a work machine.

The steering unit is a device related to the driving of the agricultural work vehicle. The agricultural work vehicle may receive power from the engine and be driven. Pressed hydraulic oil is introduced into the steering unit by a steering unit pump. When hydraulic oil is introduced into the steering unit, the steering unit may be operated using the hydraulic pressure of the hydraulic oil.

The work machine is a device related to the work of the agricultural work vehicle. The agricultural work vehicle may receive power from the engine and be driven. Pressed hydraulic oil is introduced into the work machine by a work machine pump. When hydraulic oil is introduced into the work machine, the work machine may be operated using the hydraulic pressure of the hydraulic oil.

A hydraulic passage is formed from an oil tank to the work machine or steering unit. Hydraulic oil flows inside the hydraulic passage, flows into the cylinder of the work machine or steering unit, and transmits power.

In this case, the hydraulic oil flowing inside the hydraulic passage may contain some air. For example, when hydraulic oil is supplied to the oil tank, air may be drawn in, and the drawn air may be dissolved in or mixed with the hydraulic oil. While the hydraulic oil is flowing, fine air may penetrate the hydraulic oil from the outside and be contained in the hydraulic oil for various reasons.

As described above, when the hydraulic oil contains air, various problems arise. The hydraulic oil has the characteristic of low compressibility. As air is contained in the hydraulic oil, compressibility increases, thereby causing a problem in that power cannot be completely transmitted to the work machine or steering unit. Additionally, there is a problem in that noise and vibration occur as the hydraulic oil containing air flows.

In order to solve the above problems, various efforts are being made to remove the air contained in the hydraulic oil flowing inside the hydraulic passage.

SUMMARY

An object of the present disclosure is to provide a hydraulic apparatus for an agricultural work vehicle that removes the air contained in hydraulic oil flowing inside a hydraulic passage in the hydraulic apparatus for an agricultural work vehicle, thereby improving the power transmission performance of the hydraulic apparatus and preventing noise or vibration from occurring.

The objects of the present disclosure are not limited to the object mentioned above, and other objects not mentioned will be clearly understood by those skilled in the art from the following description.

In order to accomplish the above object, according to an embodiment of the present disclosure, there is provided a hydraulic apparatus for an agricultural work vehicle, the hydraulic apparatus including: a hydraulic passage, and an oil tank configured to store hydraulic oil supplied to the hydraulic passage. A hydraulic pump supplies the hydraulic oil to the hydraulic passage by pressing it. An oil supply conduit is disposed on the hydraulic passage, and connects the oil tank and the hydraulic pump to each other. An oil return conduit is disposed on the hydraulic passage, is connected to the oil tank at one end thereof, and guides the hydraulic oil, circulated through the oil supply conduit, to the oil tank. An air drain conduit is formed such that one end thereof is connected to the oil supply conduit and the other end thereof is connected to the oil return conduit, and guides air, contained in hydraulic oil flowing through the oil supply conduit, to the oil return conduit.

The air drain conduit may be connected to the upper portion of the oil supply conduit based on the direction of gravity.

In this case, according to one embodiment of the present disclosure, the hydraulic passage may include a work machine flow path passing through a work machine supply conduit, and the air drain conduit may include a first air drain conduit connected to the oil return conduit of the work machine flow path.

In this case, according to another embodiment of the present disclosure, the hydraulic passage may include a steering unit flow path passing through a steering unit supply conduit, and the air drain conduit may include a second air drain conduit connected to the oil return conduit of the steering unit flow path.

In this case, according to still another embodiment of the present disclosure, the hydraulic passage may include a work machine flow path passing through a work machine supply conduit and a steering unit flow path passing through a steering unit supply conduit, and the air drain conduit may include a first air drain conduit connected to the oil return conduit of the work machine flow path and a second air drain conduit connected to the oil return conduit of the steering unit flow path.

In this case, the oil supply conduit may include: a common supply conduit connected to the oil tank at one end thereof; a work machine supply conduit formed such that one end thereof is connected to the other end of the common supply conduit and the other end thereof is connected to a work machine pump; and a steering unit supply conduit formed such that one end thereof is connected to the other end of the common supply conduit and the other end thereof is connected to a steering unit pump; and the air drain conduit is formed such that the first air drain conduit and the second air drain conduit are both connected to the common supply conduit and are connected at locations spaced apart from each other.

The hydraulic apparatus may further include an ejector disposed in a connection portion between the air drain conduit and the oil return conduit and configured to discharge air, flowing through the air drain conduit, into hydraulic oil flowing through the oil return conduit.

Specific details of other embodiments are included in the detailed description and the drawings.

According to the hydraulic apparatus for an agricultural work vehicle of the present disclosure, one or more of the following effects are achieved.

First, one end of the air drain conduit is connected to the oil supply conduit and the other end thereof is connected to the oil return conduit. The air in the hydraulic oil flowing through the oil supply conduit is returned to the oil tank through the air drain conduit, and only the hydraulic oil excluding air flows into the work machine or steering unit, so that there are effects in that power can be completely transmitted and noise and vibration can be prevented from occurring.

Second, the ejector generates negative pressure according to Bernoulli's principle and draws in air from the hydraulic oil flowing in the oil supply conduit. There is also an effect that air can be drawn in from the hydraulic oil even without a separate pump.

The effects of the present disclosure are not limited to the effects mentioned above, and other effects not mentioned will be clearly understood by those skilled in the art from the description of the claims.

DETAILED DESCRIPTION

Figure 1:
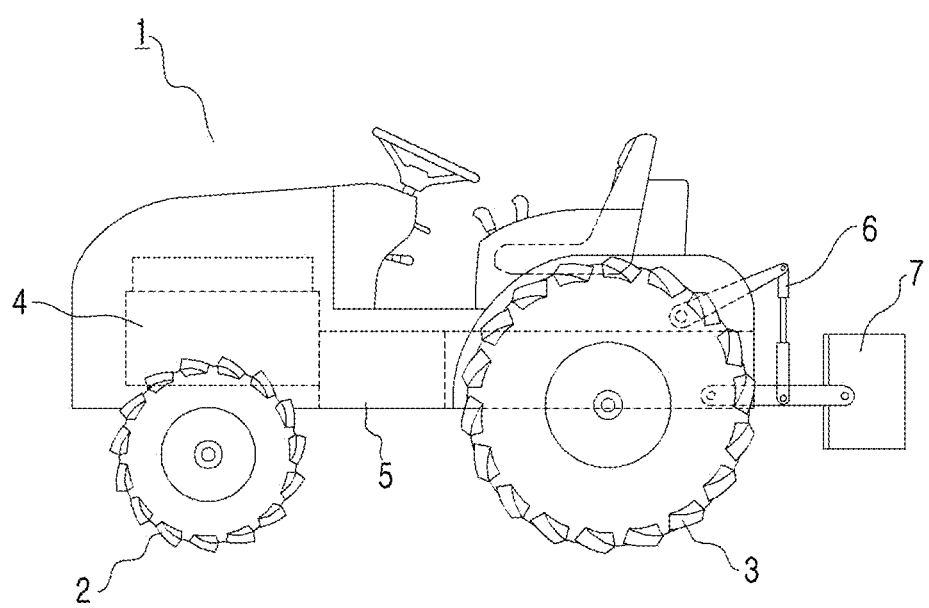
FIG. 1 is a schematic diagram showing the structure of an agricultural work vehicle according to the present disclosure.

The advantages and features of the present disclosure and methods for achieving them will become clear by referring to the embodiments described in detail below together with the accompanying However, the present disclosure is not limited to the drawings. embodiments disclosed below, but may be implemented in various different forms. These embodiments are merely provided to ensure that the disclosure of the present disclosure is complete and to fully inform those skilled in the art of the scope of the disclosure. The disclosure is defined only by the scope of the claims. Throughout the specification, like reference numerals denote like components.

The present disclosure will be described below with reference to the drawings illustrating hydraulic apparatuses for an agricultural work vehicle according to embodiments of the present disclosure.

Figure 2:
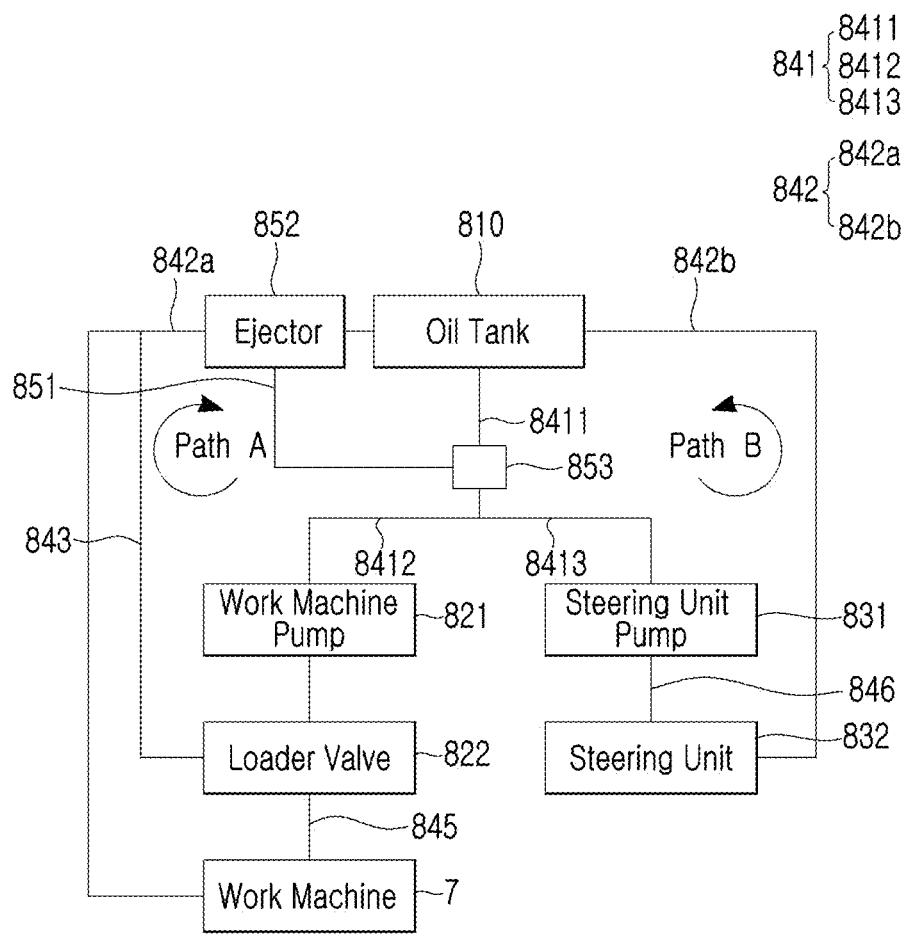
FIG. 2 is a schematic diagram showing the structure of a hydraulic circuit inside an agricultural work vehicle according to a first embodiment of the present disclosure.

FIG. 2 is a diagram showing the structure of a hydraulic circuit inside an agricultural work vehicle 1 according to the present disclosure. According to FIG. 2, a work machine pump 821 and a steering unit pump 831 are mechanically connected to an engine 4, are rotated along with the rotation of the engine 4, and are operated simultaneously.

In general, the power required to drive the steering unit 832 during driving is smaller than the power required to drive the work machine 7. Accordingly, the capacity of the work machine pump 821 is designed to be larger than that of the steering unit pump 831.

The hydraulic oil stored in an oil tank circulates through a work machine flow path (path A) passing through the work machine 7 or through a steering unit flow path (path B) passing through the steering unit 832. When the hydraulic oil contains air, noise or vibration may occur as the hydraulic oil flows inside a hydraulic passage. Alternatively, the air has higher compressibility than the hydraulic oil. Accordingly, when the hydraulic oil containing air flows into a cylinder, the volume is changed by the pressure, so that a problem arises in that high reliability cannot be achieved.

Accordingly, the hydraulic apparatus for an agricultural work vehicle according to the present disclosure includes an air drain conduit 851. One end of the air drain conduit 851 is connected to an oil supply conduit 841, and the other end thereof is connected to an oil return conduit 842. With this arrangement, the air drain conduit 851 separates air from the hydraulic oil flowing inside the oil supply conduit 841 and allows the separated air to flow. The separated air passes through the oil return conduit 842 and is returned to the oil tank 810. Accordingly, only the hydraulic oil from which the air has been removed flows inside the hydraulic passage, so that noise or vibration does not occur, with the result that high reliability can be achieved.

Additionally, the hydraulic apparatus for an agricultural work vehicle according to the present disclosure includes an ejector 852. The ejector 852 may generate negative pressure according to Bernoulli's principle, and may separate and draw in air from the hydraulic oil using the negative pressure. Accordingly, air may be easily separated from the hydraulic oil even without a separate pump for pumping air.

The hydraulic apparatus for an agricultural work vehicle according to the present disclosure will be described in detail below.

An agricultural vehicle according to the present disclosure may be the agricultural work vehicle 1 such as a tractor, a combine, or the like.

Referring to FIG. 1, the agricultural work vehicle 1 includes drive wheels 2 and 3. The drive wheels 2 and 3 are components that move the agricultural work vehicle 1.

The drive wheels 2 and 3 may be divided into front wheels 2 and rear wheels 3.

The front wheels 2 are disposed in front of the center of gravity of the agricultural work vehicle 1. The front wheels 2 support the front half of the agricultural work vehicle 1.

The front wheels 2 may be mechanically connected to the steering unit 832. Accordingly, when the steering unit 832 is operated, the front wheels 2 may be rotated, and the agricultural work vehicle 1 may be turned and moved.

The front wheels 2 may be mechanically connected to the engine 4. Accordingly, the front wheels 2 may receive the driving force of the engine 4 and move the work vehicle selectively forward and rearward.

The rear wheels 3 are disposed behind the center of gravity of the agricultural work vehicle 1. The rear wheels 3 support the rear half of the agricultural work vehicle 1.

The rear wheels 3 are mechanically connected to the engine 4. Accordingly, the rear wheels 3 may receive the driving force of the engine 4 and move the work vehicle selectively forward and rearward.

The rear wheels 3 may be mechanically connected to the steering unit 832. Accordingly, when the steering unit 832 is operated, the rear wheels 3 may be rotated together with or separately from the front wheels 2.

The diameter of the front wheels 2 may be formed to be smaller than that of the rear wheels 3.

Referring to FIG. 1, an agricultural work vehicle 1 includes the engine 4. The engine 4 provides driving force to the agricultural work vehicle 1.

The engine 4 is mechanically connected to the drive wheels 2 and 3, so that the agricultural work vehicle 1 can be driven when the engine 4 is operated.

The engine 4 is mechanically connected to the work machine 7, and thus, can drive the work machine 7 so that the work machine 7 performs various tasks.

The engine 4 may be connected to a main pump and operate the main pump, and the hydraulic oil may be supplied to the work machine flow path (path A) connected to the work machine 7.

The engine 4 may be connected to the steering pump and operate the steering pump, and the hydraulic oil may be supplied to the steering unit flow path (path B) connected to the steering unit 832.

The engine 4 may be placed in the front half of the agricultural work vehicle 1. The front half refers to the portion of the agricultural work vehicle 1 in front of the midpoint between the front and rear ends of the agricultural work vehicle 1. Alternatively, the front half may refer to the portion of the agricultural work vehicle 1 in front of the center of gravity of the agricultural work vehicle 1.

The engine 4 may be placed over the front ones 2 of the drive wheels 2 and 3.

Referring to FIG. 1, the agricultural work vehicle 1 includes a work machine drive unit 6. The work machine drive unit 6 is a component that drives the work machine 7 using the power of the engine 4 and the pressure of the hydraulic oil.

The work machine drive unit 6 may move the work machine 7, for example, by raising and lowering the work machine 7.

The hydraulic oil circulates through the work machine drive unit 6, and the work machine drive unit 6 is operated by hydraulic pressure.

Referring to FIG. 1, the agricultural work vehicle 1 includes the work machine 7. The work machine 7 refers to a tool for agricultural work. The work machine 7 may be a backhoe for digging up the soil, or a plow or rotary for clearing the soil. In addition to the above-described mechanisms, the work machine 7 may include all mechanisms within the range in which those skilled in the art can easily adopt them.

Referring to FIG. 2, a hydraulic circuit circulating through the agricultural work vehicle 1 will be described.

The oil tank 810 is a component that stores hydraulic oil.

The hydraulic oil stored in the oil tank 810 may circulate through the work machine flow path (path A). The hydraulic oil circulating through the work machine flow path (path A) circulates from the oil tank 810 through the work machine pump 821, a loader valve 822, and the work machine 7 and is returned back to the oil tank 810. Alternatively, when the loader valve 822 is turned on, the hydraulic oil circulates only through the work machine pump 821 and the loader valve 822 and is then returned to the oil tank 810. The hydraulic oil circulating through the work machine flow path (path A) flows through a work machine inlet conduit 845.

Hydraulic pumps are components that press and pump hydraulic oil. The hydraulic pumps are operated by the engine 4. The hydraulic pumps are mechanically connected to the power of the engine 4 and are driven by receiving power from the engine 4.

The fluid pressed by the hydraulic pumps is used for the lubrication and operation of vehicle parts of the agricultural work vehicle 1.

Such hydraulic pumps may be divided into fixed delivery type-hydraulic pumps in which the volume of hydraulic oil discharged is constant and variable delivery type-hydraulic pumps in which the volume of hydraulic oil discharged can be changed. The hydraulic pumps according to the present disclosure may be of a fixed delivery type or a variable delivery type.

The hydraulic pumps included in the agricultural work vehicle 1 according to the present disclosure may be divided into the work machine pump 821 and the steering unit pump 831.

The work machine pump 821 is a component that presses and circulates the hydraulic oil inside the work machine flow path (path A). The work machine pump 821 is disposed downstream of the oil tank 810. The work machine pump 821 is connected to the oil tank 810 and supplies the hydraulic oil to the work machine 7.

The hydraulic oil flowing through the work machine inlet conduit 845 may be supplied to the work machine drive unit 6 for driving the work machine 7, as shown in FIG. 1. Although the hydraulic oil flowing through the work machine inlet conduit 845 may be described as being supplied to the work machine 7 in the following description, the hydraulic oil is not limited to the above description but may be described as being supplied to the work machine drive unit 6.

The work machine inlet conduit 845 is a component through which the hydraulic oil circulating in the work machine flow path (path A) flows. The work machine inlet conduit 845 connects the work machine pump 821 and the work machine 7. One end of the work machine inlet conduit 845 is connected to the work machine pump 821. The other end of the work machine inlet conduit 845 is connected to the work machine 7.

Furthermore, the work machine inlet conduit 845 may pass through the loader valve 822. The loader valve 822 is a component that may selectively supply hydraulic pressure to a loader provided at the front of the agricultural work vehicle 1. The loader valve 822 may be disposed downstream of the work machine pump 821, and more specifically, may be disposed between the work machine pump 821 and the work machine 7. Additionally, a drain conduit 843 connecting the loader valve 822 and the oil return conduit 842 may be connected to the loader valve 822.

When the loader valve 822 is turned off, the hydraulic oil discharged from the work machine pump 821 passes through the loader valve 822 and flows into the work machine 7 along the work machine inlet conduit 845. When the loader valve 822 is turned on, the hydraulic oil discharged from the work machine pump 821 is supplied to the loader through the loader valve 822, drives the loader, and is returned to the oil tank 810 via the drain conduit 843.

Meanwhile, the hydraulic oil stored in the oil tank 810 may circulate through the steering unit flow path (path B). The hydraulic oil circulating through the steering unit flow path (path B) circulates from the oil tank 810 through the steering unit pump 831 and the steering unit 832 and is returned back to the oil tank 810. The hydraulic oil circulating through the steering unit flow path (path B) flows through the steering unit inlet conduit 846.

The steering unit pump 831 is a component that presses and circulates the hydraulic oil inside the steering unit flow path (path B). The steering unit pump 831 is disposed downstream of the oil tank 810.

The steering unit 832 is a component that drives the drive wheels 2 and 3. For example, when the steering unit 832 is operated, the drive wheels 2 and 3 may be rotated, and the agricultural work vehicle 1 may be turned and driven.

Referring to FIG. 2, the hydraulic apparatus for an agricultural work vehicle according to the present disclosure includes the air drain conduit 851. The air drain conduit 851 is a component that separates the air contained in the hydraulic oil from the hydraulic oil and bypasses it. In more detail, although the hydraulic oil together with the air are bypassed inside the air drain conduit 851, air is described as flowing inside the air drain conduit 851 for the sake of convenience.

One end of the air drain conduit 851 is connected to the oil supply conduit 841, and the other end thereof is connected to the oil return conduit 842. The air drain conduit 851 guides the air, contained in the hydraulic oil flowing through the oil supply conduit 841, to the oil return conduit 842.

With this arrangement, the air contained in the hydraulic oil flowing through the oil supply conduit 841 is separated and flows into the oil return conduit 842 through the air drain conduit 851. Accordingly, the hydraulic oil excluding air flows downstream of the air drain conduit 851 in the oil supply conduit 841, and flows into the work machine 7 or the steering unit 832. Accordingly, noise or vibration does not occur, so that high reliability can be achieved.

Referring to FIGS. 2 to 6, the oil supply conduit 841 may be divided into a common supply conduit 8411, a work machine supply conduit 8412, and a steering unit supply conduit 8413.

One end of the common supply conduit 8411 is connected to the oil tank 810. More specifically, the front end of the common supply conduit is connected to the outlet end of the oil tank 810, and hydraulic oil flows in from the oil tank 810.

One end of the work machine supply conduit 8412 is connected to the other end of the common supply conduit 8411, and the other end thereof is connected to the work machine pump 821. The work machine supply conduit 8412 branches off from the common supply conduit 8411, and some of the hydraulic oil flowing through the common supply conduit 8411 flows in.

One end of the steering unit supply conduit 8413 is connected to the other end of the common supply conduit 8411, and the other end thereof is connected to the steering unit pump 831. The steering unit supply conduit 8413 branches off from the common supply conduit 8411, and some of the hydraulic oil flowing through the common supply conduit 8411 flows in.

The hydraulic oil flowing through the common supply conduit 8411 is divided and separately flows into the work machine supply conduit 8412 and the steering unit supply conduit 8413. Alternatively, the hydraulic oil may selectively flow into the work machine supply conduit 8412 or the steering unit supply conduit 8413.

A hydraulic apparatus for an agricultural work vehicle according to a first embodiment will be described below with reference to FIG. 2.

Referring to FIG. 2, the air drain conduit 851 is connected to the common supply conduit 8411. With this arrangement, the air drain conduit 851 may separate and bypass the air contained in the hydraulic oil flowing inside the common supply conduit 8411. Accordingly, the air contained in the hydraulic oil flowing through the work machine passage (path A) and the steering unit flow path (path B) may be removed simultaneously by installing only the one air drain conduit 851.

Referring to FIG. 2, the air drain conduit 851 is connected to the oil return conduit 842a of the work machine flow path. In more detail, one end of the air drain conduit 851 is connected to the common supply conduit 8411, and the other end thereof is connected to the oil return conduit 842a of the work machine flow path. With this arrangement, the air contained in the hydraulic oil flowing inside the common supply conduit 8411 is separated from the hydraulic oil and flows through the air drain conduit 851, and flows through the oil return conduit 842a of the work machine flow path and is returned to the oil tank 810.

The capacity of the work machine pump 821 is larger than that of the steering unit pump 831, and the flow rate inside the work machine flow path (path A) is larger than that inside the steering unit flow path (path B). The flow rate and pressure of the hydraulic oil flowing inside the work path (path A) are sufficiently high, so that the width of the pressure drop increases as the hydraulic oil passes through the ejector 852. Accordingly, the negative pressure is generated more strongly, thereby allowing air to be more easily drawn in at the inlet end of the air drain conduit 851.

A hydraulic apparatus for an agricultural work vehicle according to a second embodiment of the present disclosure will be described below with reference to FIG. 3. The description of the hydraulic system apparatus of the agricultural work vehicle according to the above-described first embodiment may be adopted as long as it does not conflict with the hydraulic apparatus for an agricultural work vehicle according to the second embodiment. The hydraulic apparatus for an agricultural work vehicle according to the second embodiment will be described below with a focus on the differences from the first embodiment.

Figure 3:
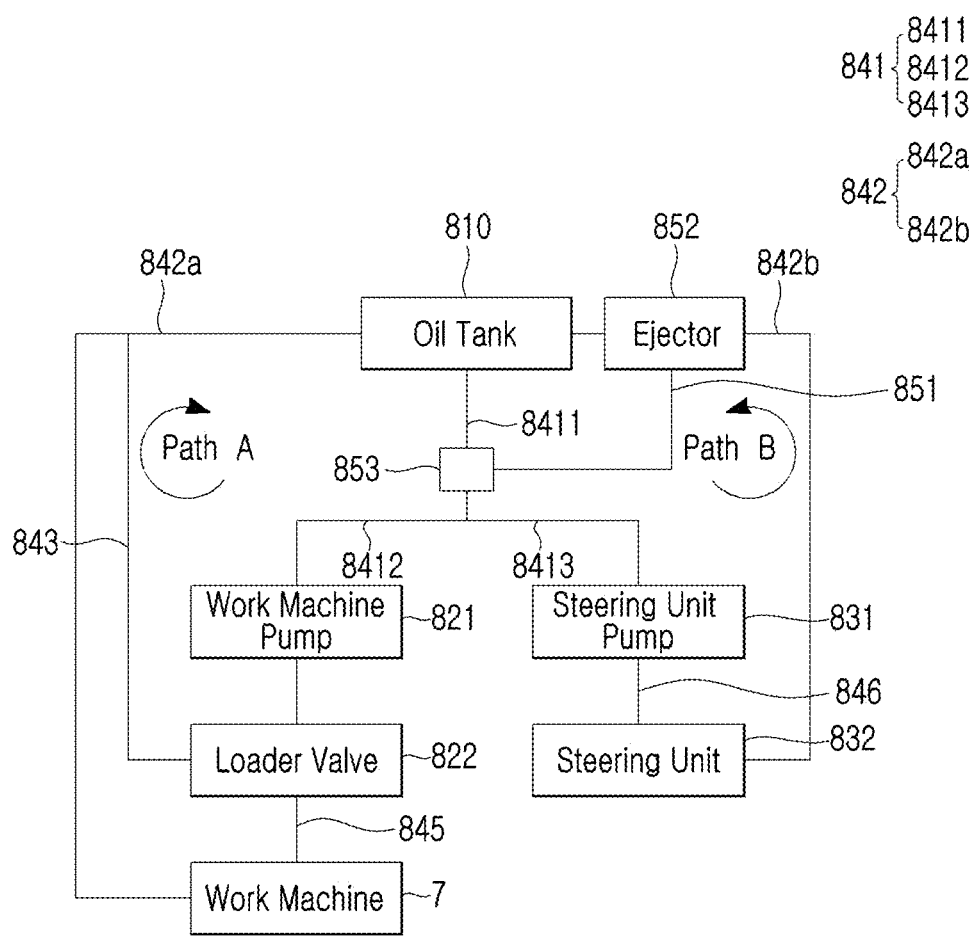
FIG. 3 is a schematic diagram showing the structure of a hydraulic circuit inside an agricultural work vehicle according to a second embodiment of the present disclosure.

Referring to FIG. 3, the hydraulic apparatus for an agricultural work vehicle according to the present disclosure includes an air drain conduit 851.

The air drain conduit 851 is connected to the oil return conduit 842b of a steering unit flow path. In more detail, one end of the air drain conduit 851 is connected to a common supply conduit 8411, and the other end thereof is connected to the oil return conduit 842b of the steering unit flow path. With this arrangement, the air contained in the hydraulic oil flowing inside the common supply conduit 8411 is separated from the hydraulic oil flow path and flows through the air drain conduit 851, and flows through the oil return conduit 842b of the steering unit flow path and is returned to an oil tank 810.

When the oil supply conduit 841 and oil return conduit 842 of the hydraulic passage of the hydraulic apparatus for an agricultural work vehicle are connected to each other, there may be a possibility that the hydraulic oil inside the oil return conduit 842 flows back into the oil supply conduit 841 due to the pressure difference.

In this case, the pressure inside a work machine flow path (path A) is formed to be higher than that of the steering unit flow path (path B). Accordingly, there may be a relatively high possibility that the hydraulic oil will flow back from the oil return conduit 842*a* of the work machine flow path to the common supply conduit 8411 through the air drain conduit 851.

Therefore, in the second embodiment, the other end of the air drain conduit 851 is connected to the oil return conduit 842*b* of the steering unit flow path, thereby preventing a back flow in the air drain conduit 851.

A hydraulic apparatus for an agricultural work vehicle according to a third embodiment of the present disclosure will be described below with reference to FIG. 4. The descriptions of the hydraulic apparatus for an agricultural work vehicle according to the above-described first or second embodiment may be adopted as long as they do not conflict with the hydraulic apparatus for an agricultural work vehicle according to the third embodiment. The hydraulic apparatus for an agricultural work vehicle according to the third embodiment will be described below with a focus on the differences from the first and second embodiments.

Figure 4:
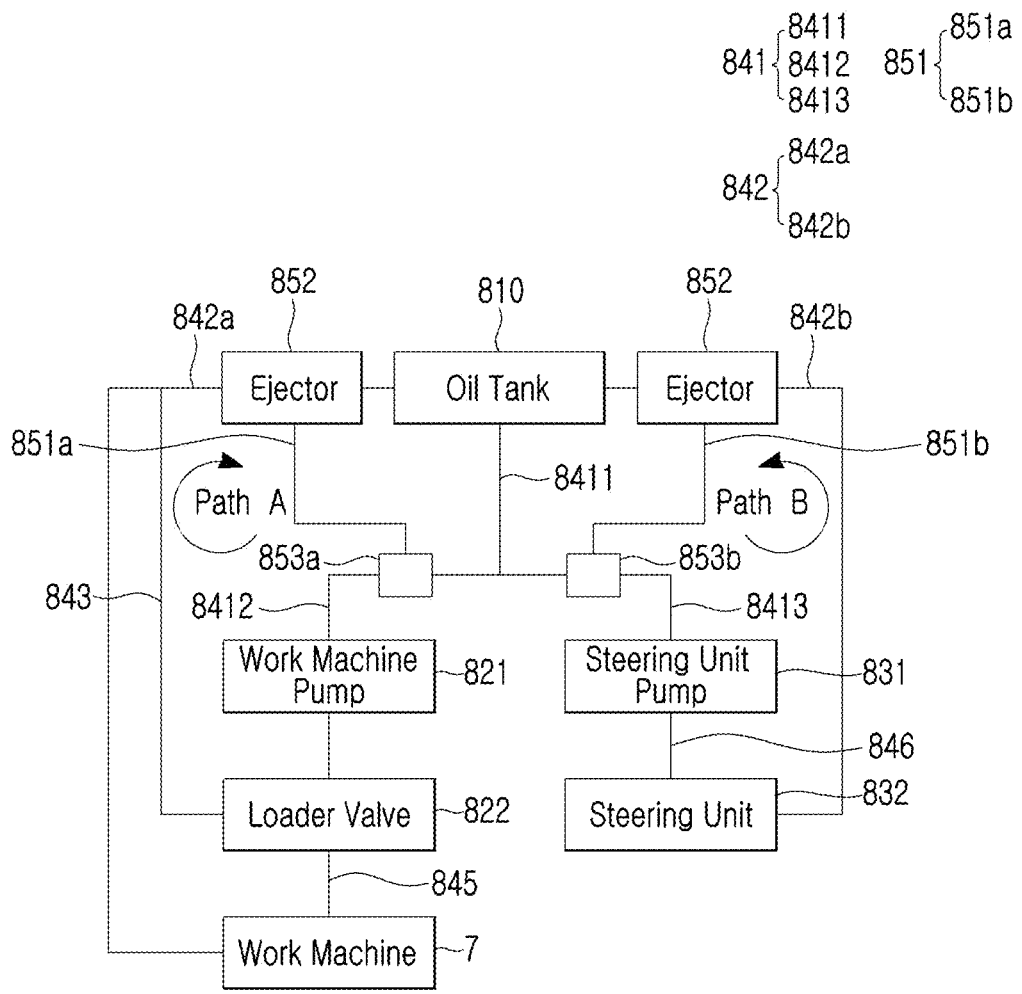
FIG. 4 is a schematic diagram showing the structure of a hydraulic circuit inside an agricultural work vehicle according to a third embodiment of the present disclosure.

Referring to FIG. 4, an air drain conduit 851 includes a first air drain conduit 851*a* and a second air drain conduit 851*b*. The first air drain conduit 851*a* is connected to the oil return conduit 842*a* of a work machine flow path, and the second air drain conduit 851*b* is connected to the oil return conduit 842*b* of a steering unit flow path.

In more detail, one end of the first air drain conduit 851*a* is connected to a work machine supply conduit 8412, and the other end thereof is connected to the oil return conduit 842*a* of the work machine flow path. Furthermore, one end of the second air drain conduit 851*b* is connected to a steering unit supply conduit 8413, and the other end thereof is connected to the oil return conduit 842*b* of the steering unit flow path. With this arrangement, the air contained in the hydraulic oil flowing through the work machine flow path (path A) passes through the first air drain conduit 851*a* and flows into the oil return conduit 842*a* of the work machine flow path, and flows into the steering unit flow path (path A). The air contained in the hydraulic oil flowing through the steering unit flow path (path B) passes through the second air drain conduit 851*b* and flows into the oil return conduit 842*b* of the steering unit flow path.

In the third embodiment, the air contained in the hydraulic oil flowing through the work machine flow path (path A) and the air contained in the hydraulic oil flowing through the steering unit flow path (path B) are removed through the respective air drain conduits 851. With this arrangement, the shapes of conduits and the structure of an ejector 852 are designed differently, and thus the dimensions that can most appropriately draw in air may be determined based on the features of the hydraulic oil flowing in the work machine flow path (path A) and the features of the hydraulic oil flowing in the steering unit flow path (path B).

Referring to FIG. 4, a first air drain conduit 851*a* and a second air drain conduit 851*b* are simultaneously disposed in a hydraulic passage. Alternatively, only the first air drain conduit 851*a* may be disposed in the hydraulic passage without the second air drain conduit 851*b*. Alternatively, only the second air drain conduit 851*b* may be disposed in the hydraulic passage without the first air drain conduit 851*a*.

A hydraulic apparatus for an agricultural work vehicle according to a fourth embodiment of the present disclosure will be described below with reference to FIG. 5. The descriptions of the hydraulic apparatuses of the agricultural work vehicles according to the above-described first to third embodiments may be adopted as long as they do not conflict with the hydraulic apparatus for an agricultural work vehicle according to the fourth embodiment. The hydraulic apparatus for an agricultural work vehicle according to the fourth embodiment will be described below with a focus on the differences from the first to third embodiments.

Figure 5:
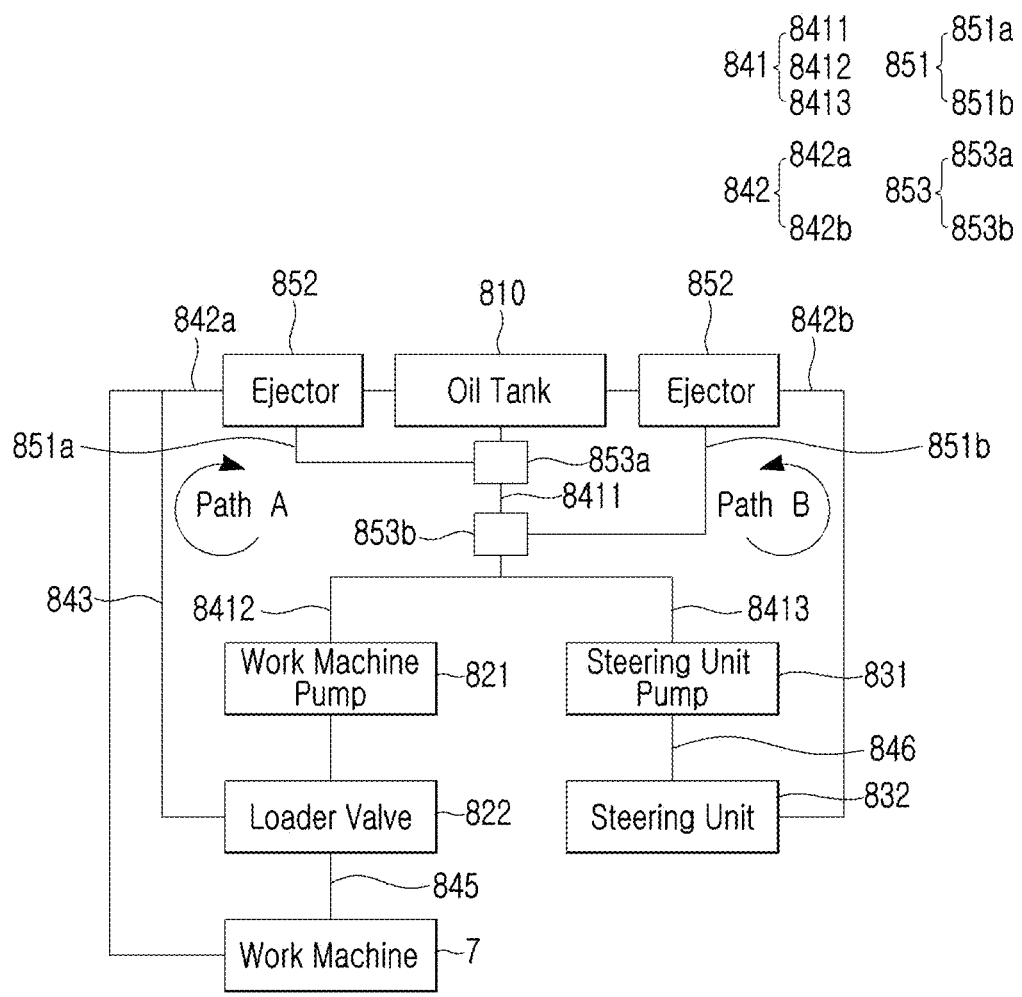
FIG. 5 is a schematic diagram showing the structure of a hydraulic circuit inside an agricultural work vehicle according to a fourth embodiment of the present disclosure.

Referring to FIG. 5, one end of the first air drain conduit 851*a* is connected to a common supply conduit 8411 (at 853*a*), and the other end thereof is connected to the oil return conduit 842*a* of a work machine flow path. Furthermore, one end of the second air drain conduit 851*b* is connected to the common supply conduit 8411 (at 853*b*), and the other end thereof is connected to the oil return conduit 842*b* of a steering unit flow path. With this arrangement, the air contained in the hydraulic oil flowing through the common supply conduit 8411 may be introduced into the first air drain conduit 851*a* or the second air drain conduit 851*b* in two steps.

In more detail, the first air drain conduit 851*a* may be connected to the common supply conduit 8411 upstream of the second air drain conduit 851*a*. In other words, a connection portion 853*a* between the first air drain conduit 851*a* and the common supply conduit 8411 is disposed upstream of a connection portion 853*b* between the second air drain conduit 851*b* and the common supply conduit 8411. With this arrangement, some of the air contained in the hydraulic oil flowing through the common supply conduit 8411 flows into the first air drain conduit 851*a*, and the remaining air thereof flows into the second air drain conduit 851*b*.

Unlike in FIG. 5, the first air drain conduit 851*a* may be connected to the common supply conduit 8411 downstream of the second air drain conduit 851*a*.

According to the fourth embodiment, the air contained in the hydraulic oil is drained first and second, i.e., twice. The air in the hydraulic oil may be removed more effectively.

Figure 6:
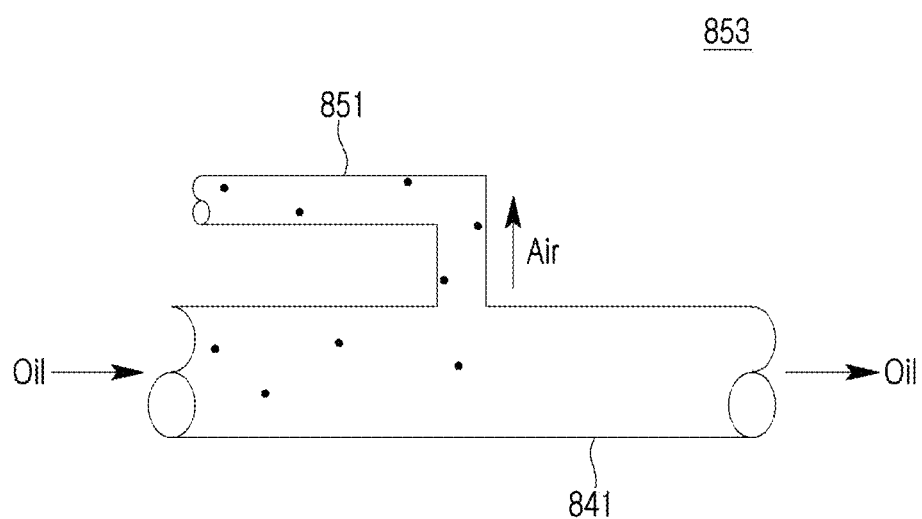
FIG. 6 is an enlarged view showing a connection portion between an air drain conduit and an oil supply conduit.

Referring to FIG. 6, an air drain conduit 851 according to the present disclosure is connected to the upper portion of an oil supply conduit 841 based on the direction of gravity.

The air drain conduit 851 may be connected to the top of the oil supply conduit 841 and extend upward. With this arrangement, the air contained in the hydraulic oil flowing through the oil supply conduit 841 may be collected on the ceiling of the oil supply conduit 841 by buoyancy and flow into the air drain conduit 851 connected to the top.

Figure 7:
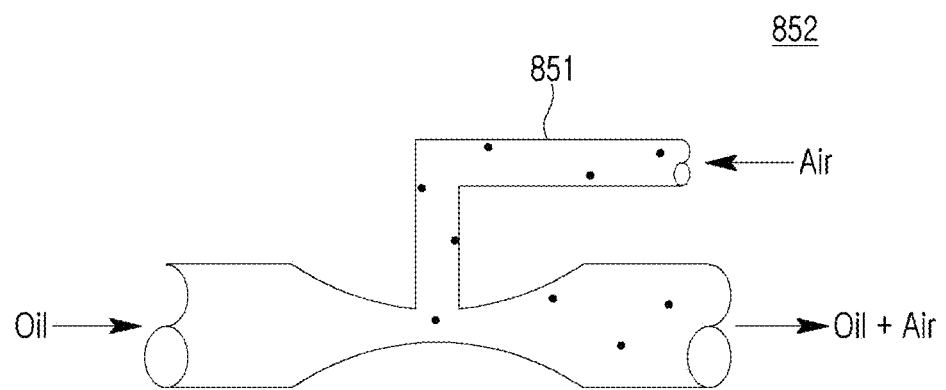
FIG. 7 is an enlarged view showing a portion of an oil return conduit in which an ejector is installed.

Referring to FIG. 7, a hydraulic apparatus for an agricultural work vehicle according to the present disclosure includes an ejector 852. The ejector 852 is a component that draws in air by generating negative pressure. The ejector 852 is disposed in a connection portion 853 between an air drain conduit 851 and an oil return conduit 842.

The ejector 852 may be disposed in the oil return conduit 842*a* of the work machine flow path as shown in FIG. 2, may be disposed in the oil return conduit 842*b* of the steering unit flow path as shown in FIG. 3, and may be disposed on both sides as shown in FIGS. 4 and 5.

Referring to FIG. 7, the ejector 852 is formed to be long along the direction of movement of the hydraulic oil flowing inside the oil return conduit 842. The air drain conduit 851 is connected to the ejector 852 in a direction crossing the longitudinal direction of the ejector 852. With this arrangement, the hydraulic oil flows along the longitudinal direction of the ejector 852, and air flowing inside the air drain conduit 851 flows in from its side and is discharged into the oil tank 810 together with the hydraulic oil inside the ejector 852.

The air drain conduit 851 is connected to the ejector 852 in the radial direction of the ejector 852. In a connection portion between the air drain conduit and the ejector 852, the extension direction of the air drain conduit 851 and the longitudinal direction of the ejector 852 may be perpendicular to each other.

Referring to FIG. 7, based on the portion where the air drain conduit 851 and the ejector 852 are connected to each other, the diameter of the ejector 852 increases toward both ends. With this arrangement, according to the continuity theorem, in the connection portion between the air drain conduit 851 and the ejector 852, the speed of the hydraulic oil gradually increases as it moves from the front end of the ejector 852 to the connection portion, and gradually decreases as it moves from the connection portion to the rear end of the ejector 852. Accordingly, according to Bernoulli's theorem, the flow speed in the connection portion between the air drain conduit 851 and the ejector 852 becomes the highest. As a result, when negative pressure is generated in the connection portion between the air drain conduit 851 and the ejector 852, the air flowing in the oil supply conduit 841 flows into the ejector 852 through the air drain conduit 851.

According to the present disclosure, the air contained in the hydraulic oil flowing through the oil supply conduit 841 flows into the oil return conduit 842 through the air drain conduit 851 and is returned into the oil tank 810. Accordingly, only the hydraulic oil from which the air has been removed flows in a subsequent hydraulic passage. There are provided effects in that the high reliability of operation may be achieved and noise or vibration does not occur.

While the preferred embodiments of the present disclosure have been illustrated and described above, the present disclosure is not limited to the specific embodiments described above. It will be apparent that various modifications may be made by those having ordinary skill in the art to which the present disclosure pertains without departing from the gist of the disclosure claimed in the patent claims. These modified implementations should not be understood separately from the technical spirit or perspective of the present disclosure.

The invention claimed is:

1. A hydraulic apparatus for an agricultural work vehicle, the hydraulic apparatus comprising:
a hydraulic passage;
an oil tank configured to store hydraulic oil supplied to the hydraulic passage;
a hydraulic pump configured to supply the hydraulic oil to the hydraulic passage by pressing the hydraulic oil;
an oil supply conduit disposed on the hydraulic passage, and configured to connect the oil tank and the hydraulic pump to each other;
an oil return conduit disposed on the hydraulic passage, connected to the oil tank at one end thereof, and configured to guide the hydraulic oil, circulated through the oil supply conduit, to the oil tank; and
an air drain conduit formed such that a first end of the air drain conduit is connected to the oil supply conduit and a second end of the air drain conduit, opposite to the first end, is connected to the oil return conduit, and configured to guide air, contained in the hydraulic oil flowing through the oil supply conduit, to the oil return conduit, wherein the air drain conduit is connected to an upper portion of the oil supply conduit based on a direction of gravity.

2. The hydraulic apparatus of claim 1, wherein:
the oil supply conduit comprises a work machine supply conduit;
the hydraulic passage includes a work machine flow path passing through the work machine supply conduit; and
the air drain conduit includes a first air drain conduit connected to an oil return conduit of the work machine flow path.

3. The hydraulic apparatus of claim 1, wherein:
the oil supply conduit comprises a steering unit supply conduit;
the hydraulic passage includes a steering unit flow path passing through a steering unit supply conduit; and
the air drain conduit includes a second air drain conduit connected to an oil return conduit of the steering unit flow path.

4. The hydraulic apparatus of claim 1, wherein:
the oil supply conduit comprises a work machine supply conduit and a steering unit supply conduit,
the oil return conduit comprises a work machine return conduit and a steering unit return conduit,
the hydraulic passage includes a work machine flow path passing through the work machine supply conduit and the work machine return conduit,
the hydraulic passage further includes a steering unit flow path passing through the steering unit supply conduit and the steering unit return conduit; and
the air drain conduit includes a first air drain conduit connected to the work machine return conduit and a second air drain conduit connected to the steering unit return conduit.

5. The hydraulic apparatus of claim 4, wherein:
the hydraulic pump comprises a work machine pump and a steering unit pump;
the oil supply conduit includes:
a common supply conduit having a first end connected to the oil tank and a second end, opposite to the first end;
the work machine supply conduit formed such that a first end of the work machine supply conduit is connected to the second end of the common supply conduit and a second end of the work machine supply conduit, opposite to the first end of the work machine supply conduit, is connected to the work machine pump; and
the steering unit supply conduit formed such that a first end of the steering unit supply conduit is connected to the second end of the common supply conduit and a second end of the steering unit supply conduit, opposite to the first end of the steering unit supply conduit, is connected to the steering unit pump; and
the air drain conduit is formed such that the first air drain conduit and the second air drain conduit are both connected to the common supply conduit and are connected at locations spaced apart from each other.

6. The hydraulic apparatus of claim 1, further comprising an ejector disposed in a connection portion between the air drain conduit and the oil return conduit and configured to discharge the air, flowing through the air drain conduit, into the hydraulic oil flowing through the oil return conduit.

7. The hydraulic apparatus of claim 6, wherein:
the ejector is formed to be long along a direction of movement of the hydraulic oil flowing inside the oil return conduit; and
the air drain conduit is connected to the ejector in a direction crossing a longitudinal direction of the ejector.

8. The hydraulic apparatus of claim 7, wherein a diameter of the ejector increases toward both ends thereof based on a portion where the air drain conduit and the ejector are connected to each other.

* * * * *